United States Patent
Bergman et al.

(10) Patent No.: US 8,413,863 B2
(45) Date of Patent: Apr. 9, 2013

(54) ATTACHMENT MEANS AND BAG INCLUDING SAME

(75) Inventors: Suzi Bergman, London (GB); Melanie Marshall, London (GB); Morven Mulgrew, London (GB)

(73) Assignee: Babymel Ltd. (GB)

( * ) Notice: Subject to any disclaimer, the term of this patent is extended or adjusted under 35 U.S.C. 154(b) by 596 days.

(21) Appl. No.: 12/177,612

(22) Filed: Jul. 22, 2008

(65) Prior Publication Data

US 2009/0321487 A1    Dec. 31, 2009

(30) Foreign Application Priority Data

Jun. 27, 2008   (GB) .................................. 0811779.8

(51) Int. Cl.
*B60R 9/00* (2006.01)
*A45F 3/02* (2006.01)

(52) U.S. Cl. .................. 224/409; 224/585; 224/614

(58) Field of Classification Search .................. 224/257, 224/258, 409, 578, 584, 585, 264, 917, 614, 224/616, 617, 618
See application file for complete search history.

(56) References Cited

U.S. PATENT DOCUMENTS

| | | | | |
|---|---|---|---|---|
| 4,186,859 A * | 2/1980 | Frankfort et al. | ............. | 224/579 |
| 4,911,347 A * | 3/1990 | Wilhite | ............. | 224/257 |
| 4,961,522 A * | 10/1990 | Weber | ............. | 224/585 |
| 5,044,538 A * | 9/1991 | Bader | ............. | 224/258 |
| 5,603,545 A * | 2/1997 | Benson et al. | ............. | 294/150 |
| 5,702,038 A * | 12/1997 | Miller et al. | ............. | 224/409 |
| 5,702,039 A * | 12/1997 | Olaiz | ............. | 224/409 |
| 5,810,230 A | 9/1998 | Nutto | | |
| 5,950,893 A * | 9/1999 | Heggeland | ............. | 224/578 |
| 6,606,768 B2 * | 8/2003 | Henry et al. | ............. | 24/306 |
| 6,766,930 B2 * | 7/2004 | Dixon et al. | ............. | 224/409 |
| 8,113,399 B2 * | 2/2012 | Lee | ............. | 224/578 |
| 2010/0320246 A1 * | 12/2010 | Taylor | ............. | 224/411 |

FOREIGN PATENT DOCUMENTS

| | | |
|---|---|---|
| DE | 298 02 422 U1 | 2/1998 |
| GB | 0 180 314 A3 | 9/1985 |
| JP | 2008143497 | 12/2006 |

* cited by examiner

*Primary Examiner* — Justin Larson
(74) *Attorney, Agent, or Firm* — Morrison & Foerster LLP

(57) ABSTRACT

The present invention provides an integrated attachment and carrying means for detachable attachment to a transport device comprising a carrying means for carrying by a user; and at least one attachment means comprising a means for attachment to a transport device, wherein the attachment means is attached to or integrated with the carrying means. The invention further provides a bag featuring such an integrated attachment and carrying means and a method of use of such an integrated attachment and carrying means.

20 Claims, 9 Drawing Sheets

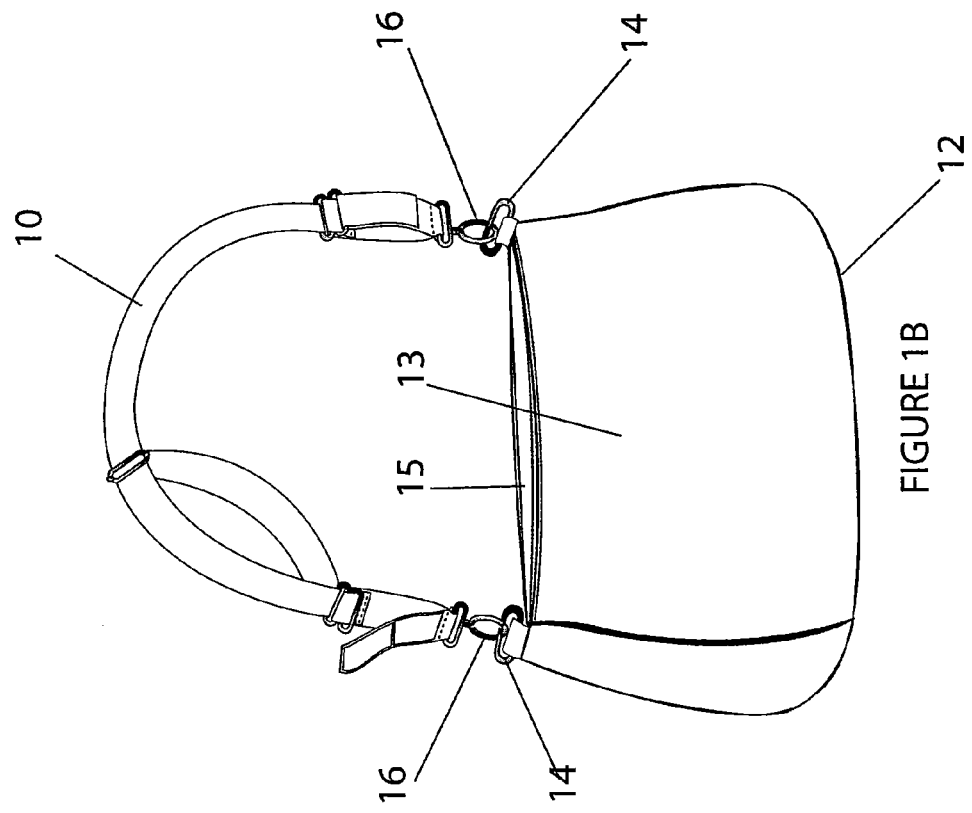
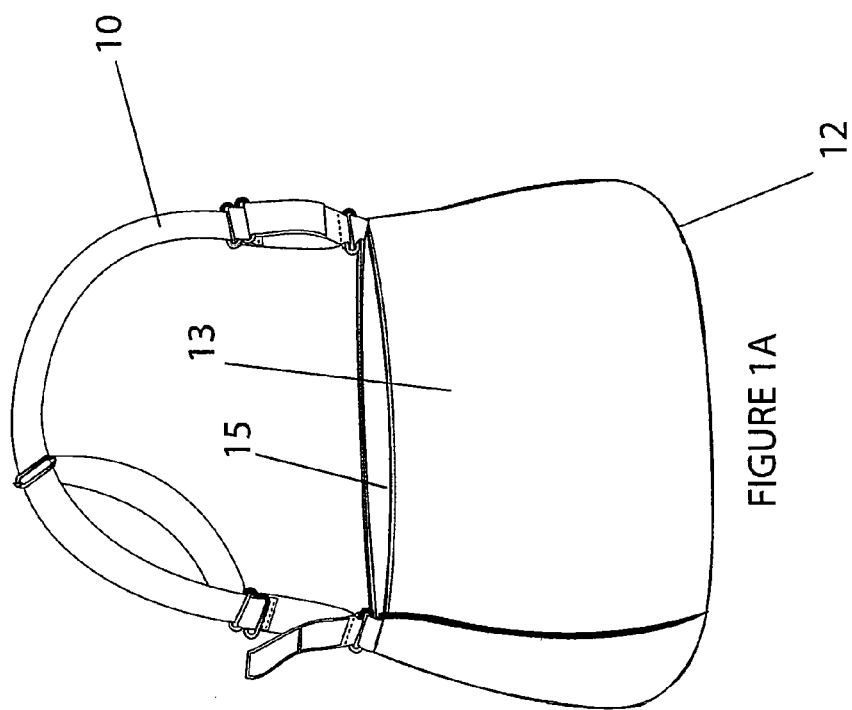

ATTACHMENT MEANS AND BAG INCLUDING SAME

FIELD

The present invention relates to an attachment means and a bag including same. Moreover, the present invention is of an integrated means for holding and attaching a bag to a transporting vehicle and a bag including same.

BACKGROUND

Bags specifically designed to hold articles belonging to a baby or infant are commonly used by parents and child minders. The term 'baby bag' as used herein refers to any type of bag or similar carrier configured to hold baby, infant or child related items. The term includes for example diaper bags, changing bags, feeding bags and bottle holder bags. Such baby bags are useful for storing and transporting important infant related items, such as baby changing articles, nappies, bottles, change of clothing, dummies etc. In view that these items are typically required on a frequent and erratic basis, baby bags are commonly used when the baby is away from the home setting, such as for example when the baby is being transported in a pram or pushchair.

Typically, baby bags include a means by which the bag can be carried by a user, for example by hand or on the shoulder or back. Common carrying means include one or a plurality of handles or straps. However, when the infant is in a baby transporting vehicle, it is also desirable for the bag to be attachable to the transporting vehicle. The term 'baby transporting vehicle', 'baby transport device' or 'baby transporting device' as used herein refer to any suitable apparatus for moving a baby from one place to another. The term includes but is not limited to for example prams, pushchairs, strollers, buggies, car seats, bicycles, tricycles, children's play cars and motorbikes. Attaching the bag to a baby transporting vehicle, eliminates the need for the person accompanying the infant to separately carry the bag and to carry the extra weight of the bag and contents. Further, attachment of the bag to the baby transporting vehicle enables facile storage of the bag and focuses the whereabouts of the bag for quick access.

One method for attaching such bags includes hanging a regular strap over the handlebar of the baby transporting vehicle. However, an inherent disadvantage of such a method is that the bag can easily slip off or slip down and interfere with the transport of the vehicle.

Some baby bags include means for attaching the bag to the transport vehicle and separate means for carrying the bag. However, this results in a bag which is aesthetically displeasing, non-compact and often complicated to use.

It would therefore be advantageous to have a means for secure and safe attachment of a baby bag to a transport vehicle. It would further be desirable to have an attachment means which is integrated with the carrying means for facile use.

SUMMARY

Aspects of the invention include an integrated attachment and carrying means. The integrated attachment and carrying means may be included in a baby bag and may be for carrying a baby bag and for attaching a baby bag to a baby transport vehicle.

In one aspect the integrated attachment and carrying means comprises a carrying means for carrying by a user and at least one attachment means for attachment to a transport device, wherein the at least one attachment means is attached to or integrated with the carrying means.

Another aspect relates to a bag comprising a bag storage area and an integrated attachment and carrying means wherein the integrated attachment and carrying means is attached to or integrally formed with the bag storage area and is for detachable attachment to a transport device. The bag may be a baby bag. The transport device may be a baby transport device.

A further aspect relates to a method of use of a bag comprising an integrated attachment and carrying means, wherein at least one attachment means of the integrated attachment and carrying means comprises a harness comprising a first end and a second end: and an attacher, such as a securing means, which may be a two part attacher, wherein a first part of the two part attacher is connected to the first end of the harness and wherein a second part of the two part attacher is connected to the second end of the harness and wherein the first part of the two part attacher and the second part of the two part attacher are attachable one to the other in any suitable way, the method comprising disposing the carrying means on a suitable part of a transport device, such as on the handles or handlebar; attaching the at least one attachment means to the transport device, wherein attaching comprises disposing the harness about a connection point of the transport device; and connecting together the first and second part of the attacher such that the attachment means is attached to the connection point of the transport device.

BRIEF DESCRIPTION OF THE DRAWINGS

The various features of the invention will best be appreciated by simultaneous reference to the description which follows and the accompanying drawings and in which:

FIG. 1a shows schematically a bag including an integrated attachment and holding means according to one aspect of the present invention;

FIG. 1b shows schematically a bag including an integrated attachment and holding means according to an alternative aspect of the present invention;

DETAILED DESCRIPTION

Figure 2:
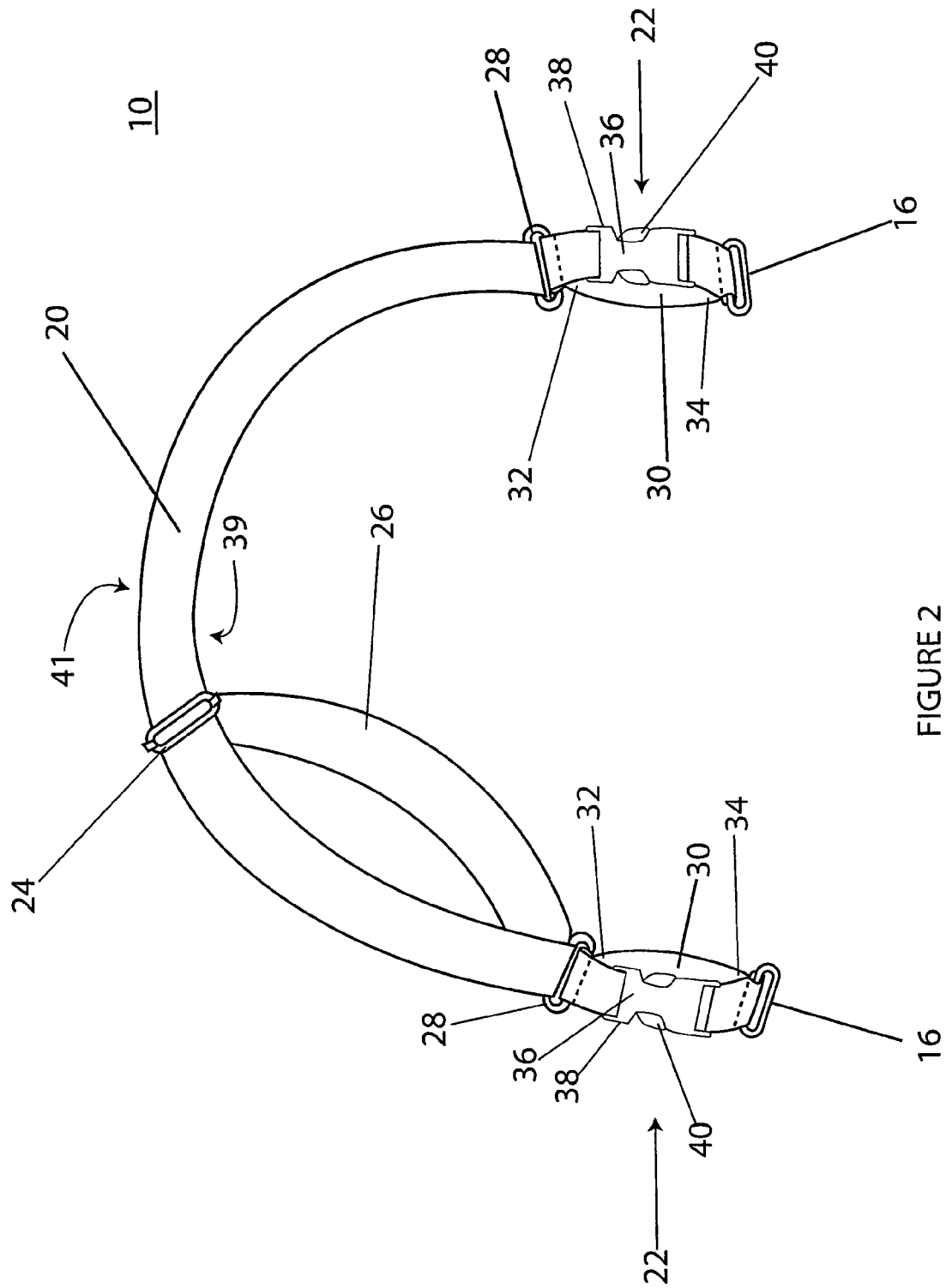
FIG. 2 shows schematically an integrated attachment and holding means according to one aspect of the present invention.

Before explaining at least one embodiment of the invention in detail, it is to be understood that the invention is not limited in this application to the details of construction and the arrangement of the components set forth in the following description or illustrated in the drawings. The invention is applicable to other embodiments of being practiced or carried out in various ways. Also, it is to be understood that the phraseology and terminology employed herein is for the purpose of description and should not be regarded as limiting.

The principles and operation of a device according to the present invention may be better understood with reference to the figures. The figures show exemplary aspects of the present invention and are not limiting.

FIG. 1a shows a schematic view of a bag including an integrated attachment and carrying means according to one aspect of the present invention. As can be seen from FIG. 1a, an integrated attachment and holding means 10 is connected to a bag 12. The bag may be any suitable bag and may include a bag storage area 13 and a bag opening 15. The integrated attachment and holding means 10 may optionally be integrally formed with the bag 12 as shown in FIG. 1a. Examples of attachment and holding means 10 which are integrally formed with the bag 12 may include bags 12 wherein the holding means 10 is an extension of the bag material or wherein the holding means 10 is sewn into the bag 12 or non-detachable in any suitable way from the bag 12. In one aspect the attachment and holding means 10 is detachable from the bag 12 as shown in FIG 1b. The attachment and holding means 10 may be reversibly attached to the bag 12 by for example one or a plurality of suitable fasteners 14 affixed to bag 12 which can be configured to be attached to one or a plurality of connectors 16 disposed at the ends of the holding means 10. Alternatively, the one or plurality of fasteners 14 may be affixed to the ends of the holding means 10 and the one or a plurality of connectors may be affixed to the bag 12. Non limiting examples of suitable fasteners 14 include at least one of clasps, hooks, buttons, magnets, ties, velcro®, at least one part of a zip and press stud means. Non limiting examples of suitable connectors include at least one of links, rings, buttonholes, magnets, ties, velcro®, press stud means and at least one part of a zip.

FIG. 2 shows a schematic view of an integrated attachment and holding means 10 according to one aspect of the present invention. Integrated attachment and holding means 10 may include at least one holding and/or carrying means 20 and one or a plurality of attachment means 22.

The holding and/or carrying means 20 may be any suitable type of holding or carrying means, such as at least one or a plurality of straps or handles and may be made from any suitable material. The term 'carrying means' and 'holding means' can be used interchangeably. It is preferred that the carrying means is made from a strong material which is capable of withstanding the weight of the bag's contents. The holding and/or carrying means 20 may be made from environmentally friendly materials. Preferably, the material is non-toxic. In one aspect, the holding and/or carrying means 20 may be configured to be waterproof. The length of the holding and carrying means 20 may be changeable, such that it may be extendable or may be reduced. In an aspect wherein the holding and carrying means 20 is extendable, the holding and carrying means 20 may include an extension means 24. One non-limiting example of a suitable extension means is a slide buckle 24, whereby the buckle can be slid over the material of the holding and carrying means 20 and/or reserve strap material 26 may be thread through the buckle 24 to extend the length of the holding and carrying means 20. Alternatively, the slide buckle 24 can be manipulated to reduce the length of the holding and carrying means 20.

The at least one or a plurality of attachment means 22 may be integrated or integrally formed with the holding and/or carrying means 20. Any suitable method of integrally forming the attachment means 22 with the holding and/or carrying means 20 may be used, such as but not limited to sewn together. In one aspect, the at least one attachment means 22 is non-detachably connected or attached to one side of a connector 28, wherein the holding and/or carrying means 20 is connected to a second side or part of the connector 28. Non-limiting examples of a suitable connector 28 include links, O rings and D rings. The attachment means 22 may be configured for disposing the integrated attachment and holding means 10 about at least one suitable attachment point of a baby transporting vehicle and attaching the integrated attachment and holding means 10 including an attached bag to the baby transporting vehicle. FIG. 2 shows one example of the integrated attachment and holding means 10, featuring two attachment means 22 for attachment to two attachment points of a baby transporting vehicle.

In one aspect, an attachment means 22 may include a harness 30 for disposing the integrated attachment and holding means 10 about a suitable attachment or connection point of a baby transporting vehicle. One non-limiting example of a suitable harness is a piece of material, of suitable dimensions, which may be configured to support the attachment means 22 and which may be disposed about a point of the baby transporting vehicle, to which the attachment means 22 may be reversibly fastened. The harness 30 may be constructed from the same material as the holding and/or carrying means 20 material, such that the attachment means 22 appears as part of or at least one extension of the holding and/or carrying means 20. The harness 30 may include a first end 32 which is in contact with the connector 28 and a second end 34 which may be connected to connector 16 or directly to the bag. The attachment means may include an attacher 38, such as a securing means, such as for example a two part attacher 38. FIG. 2 shows an attacher 38, which is a two part attacher according to one aspect of the present invention. The attacher 38 may include a first part 36 and a second part 40, wherein the first part 36 and the second part 40 may be attachable one to the other. The first part 36 of a two part attacher 38 is disposed, such as connected at or in close proximity to a first end 32 of the harness 30. The second part 40 of the two part attacher 38 may be disposed, such as connected at or in close proximity to the second end 34 of the harness. In one aspect, the two parts 36, 40 of the two part attacher 38 may each be attached to an extension of the harness. Non-limiting examples of an attacher 38 including a two part attacher include clasps and side release buckles, press studs, dog clips and velcro® strip and velcro® strip insert means. In one aspect shown in FIG. 2 wherein the two part attacher is a side release buckle, one part 36 of the buckle may be a female part and the second part 40 may be a male part or vice versa, such that the male part may be inserted into the female part of the buckle to fasten the buckle. When the bag is being held or carried by a user the two parts 36 and 40 of the attacher 38 may be connected together, such that the two part attacher 38 is self attached for a stream line design. In an aspect wherein the bag is attached to a baby transport vehicle, the two parts 36 and 40 of the attacher 38 may be fastened around a suitable point of the baby transporting vehicle such that the bag is connected about a suitable point of the baby transporting vehicle. The integrated attachment and carrying means 10 may include two sides, an inner/internal side 39 and an outer/external side 41. The inner side 39 or at least part thereof may be for contacting the body of a user when the integrated attachment and carrying means 10 is being used by a user. In one aspect, the two part attacher 38 is disposed on the external part 41 of the integrated attachment and holding means 10 and the harness 30 is disposed on an inner part 39 of the integrated attachment and holding means 10. In such an aspect, the two part attacher is overtly visible to a bystander.

Figure 3A:
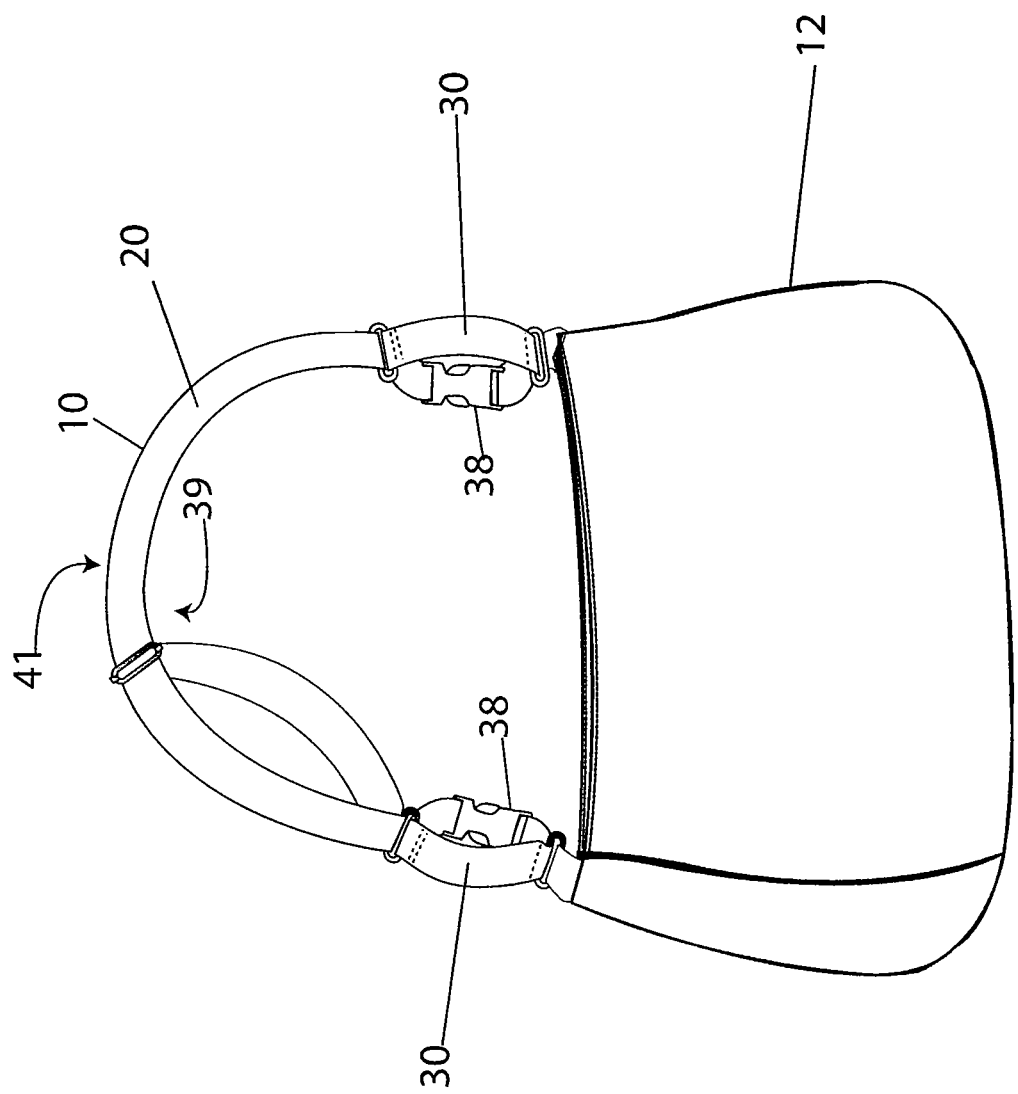
FIGS. 3a and 3b show schematically an integrated attachment and holding means according to further aspects of the present invention.
Figure 3B:
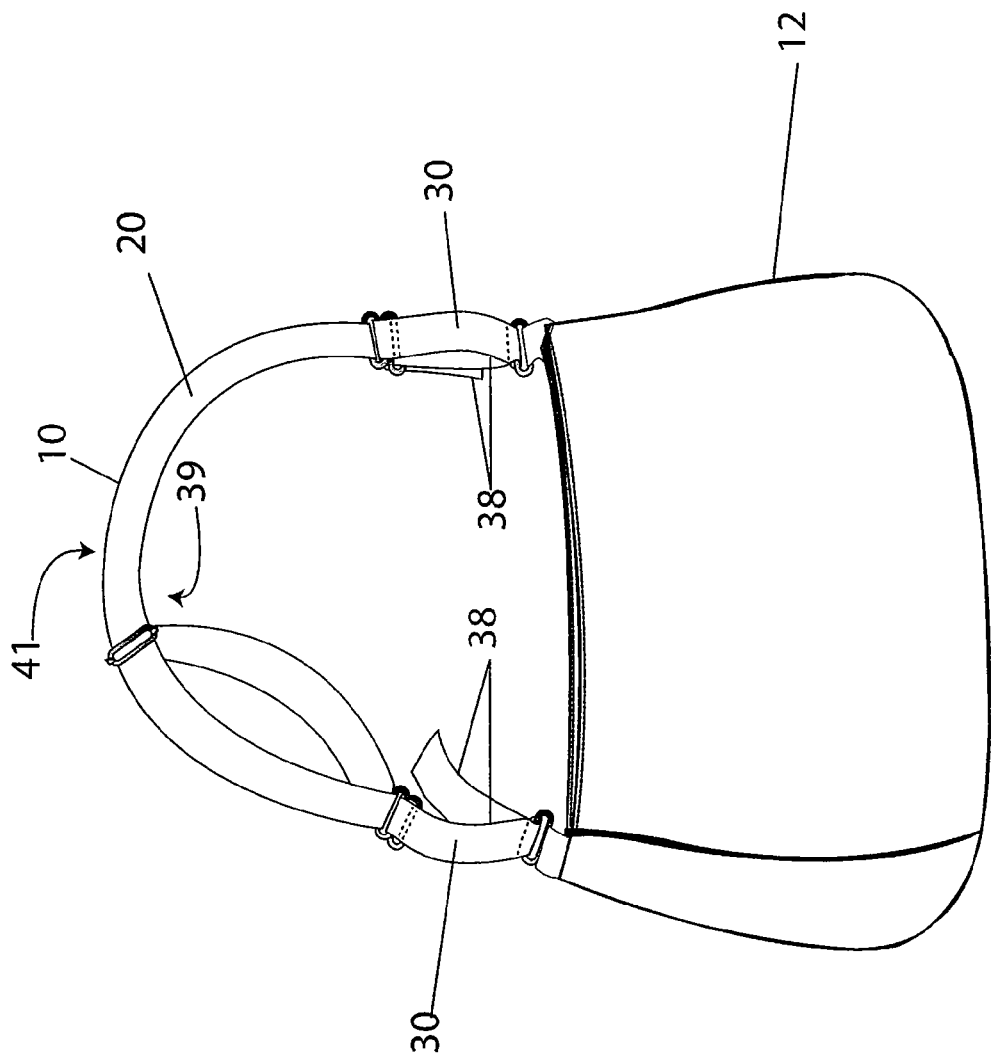

In alternative aspects shown in FIGS. 3a and 3b, integrated attachment and holding means 10 is configured so that the attacher 38 is disposed on an inner side 39 of the integrated attachment and holding means 10 and the harness 30 is disposed on an outer side 41 of the integrated attachment and holding means 10. In such an aspect, the attacher is covertly disposed and may not be substantially viewable to an onlooker. This type of configuration facilitates a carrying/holding means, which may not appear as including a baby bag attachment means and may be aesthetically pleasing. In addition, such a configuration may be more facile for a user to attach to a baby transporting vehicle.

Figure 4:
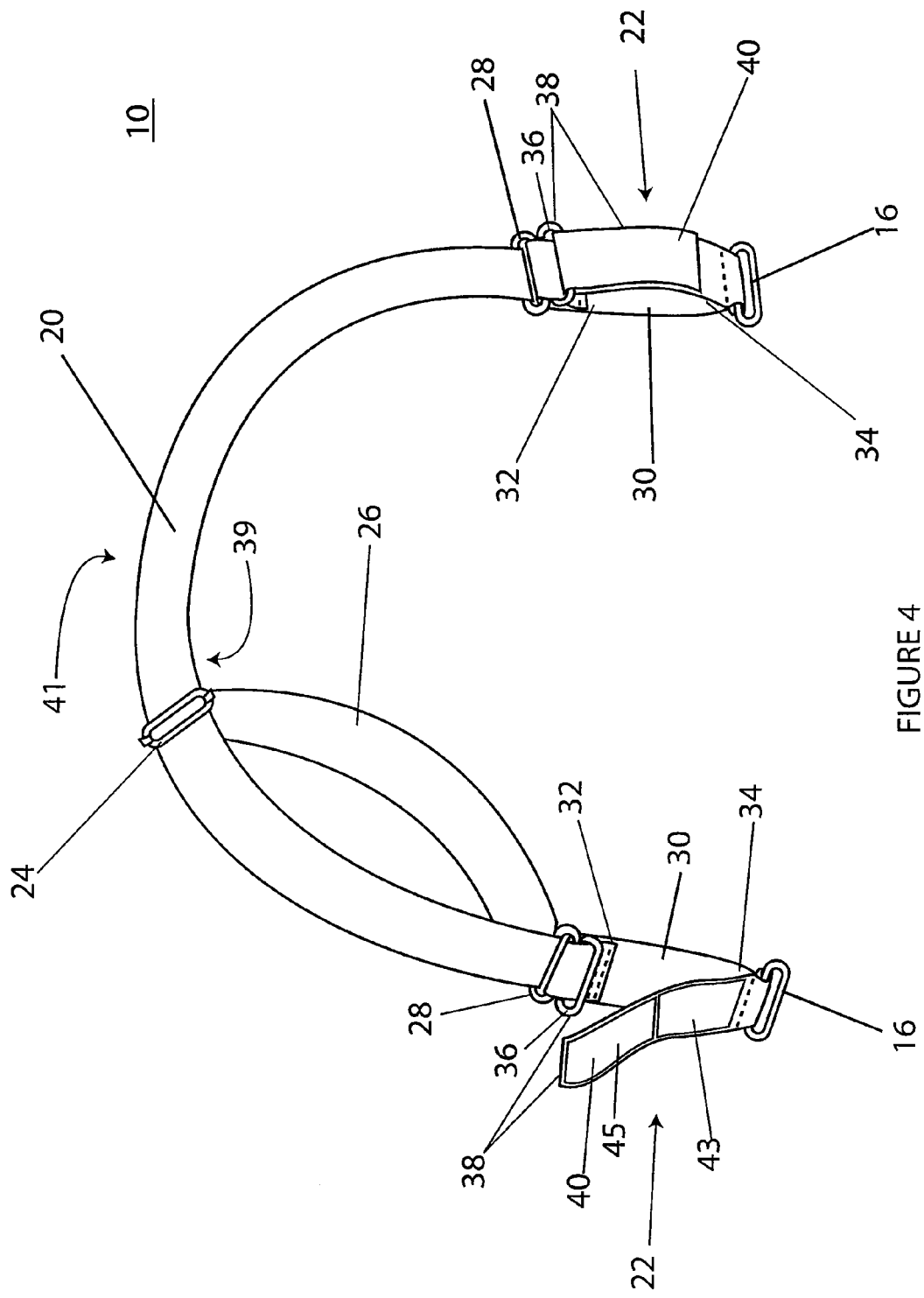
FIG. 4 shows schematically an integrated attachment and holding means with an attacher according to one aspect of the present invention.

FIG. 4 shows the attacher securing means 38 according to an alternative aspect of the present invention and may include a first part 36 and a second part 40, wherein the first part 36 and the second part 40 may be attachable one to the other. The first part 36 of the attacher 38 may be disposed such as attached at or in close proximity to a first end 32 of the harness 30. The second part 40 of the attacher 38 may be disposed at or in close proximity to the second end 34 of the harness. In one aspect, the two parts 36, 40 of the attacher 38 may each be attached to an extension of the harness. FIG. 4 shows an example of a velcro® attacher 38. The Velcro® attacher 38 may be a multi-part attacher. One part 40 of the attacher 38 may include a piece or strip of material on which is disposed in spaced apart relation the two part Velcro® means, the receiving loop part of the Velcro® 43 and the sticking hook part of the Velcro® 45 and a second part 36 of the attacher 38 may include a means 36 for inserting such as threading at least one part of the velcro® 43, 45 therethrough in order that the sticking hook part 45 of the Velcro® can be contacted with the receiving loop part 43 of the Velcro® such as being disposed one on top of the other to facilitate fastening of the attacher 38. Suitable means 36 for inserting the Velcro® therethrough include any suitable link, ring, oval ring, O ring, D ring or loop. The amount of Velcro® on the second part 40 of the attacher thread through the means 36 may be changed according to the tightness of attachment the user desires.

Figure 5:
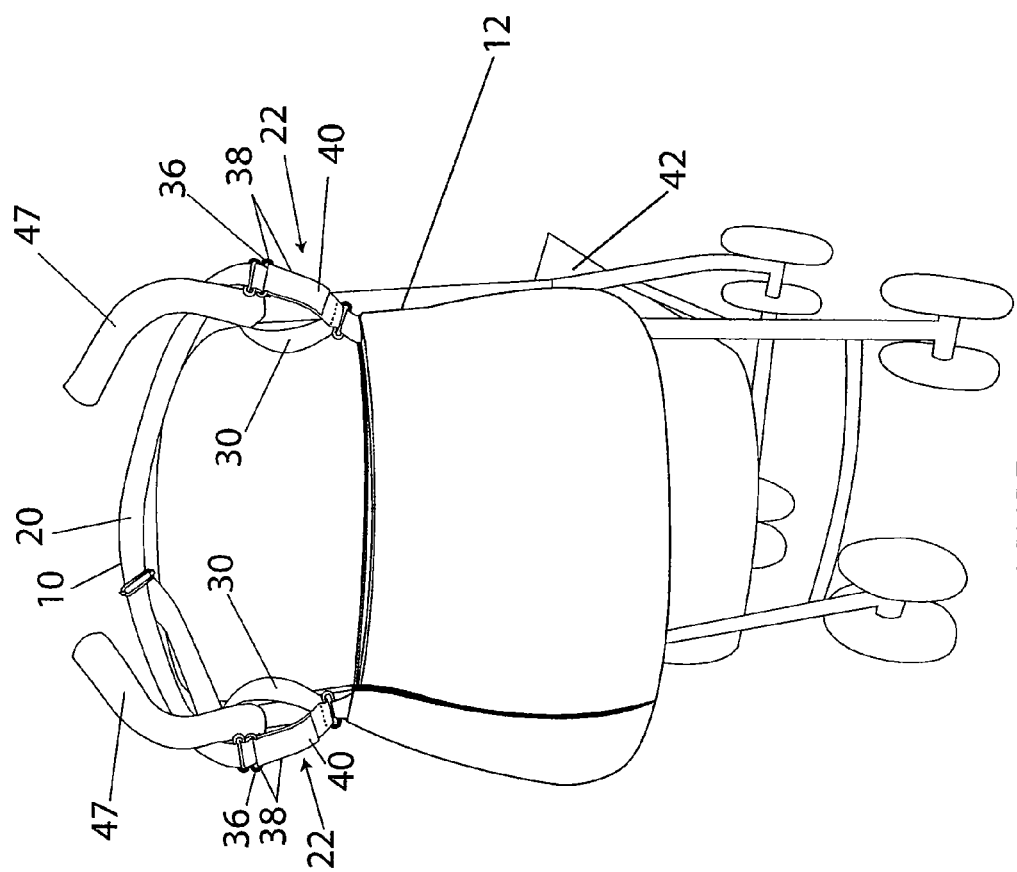
FIG. 5 shows schematically a pram with a bag attached thereto, the bag including an integrated attachment and holding means according to one aspect of the present invention.
Figure 6:
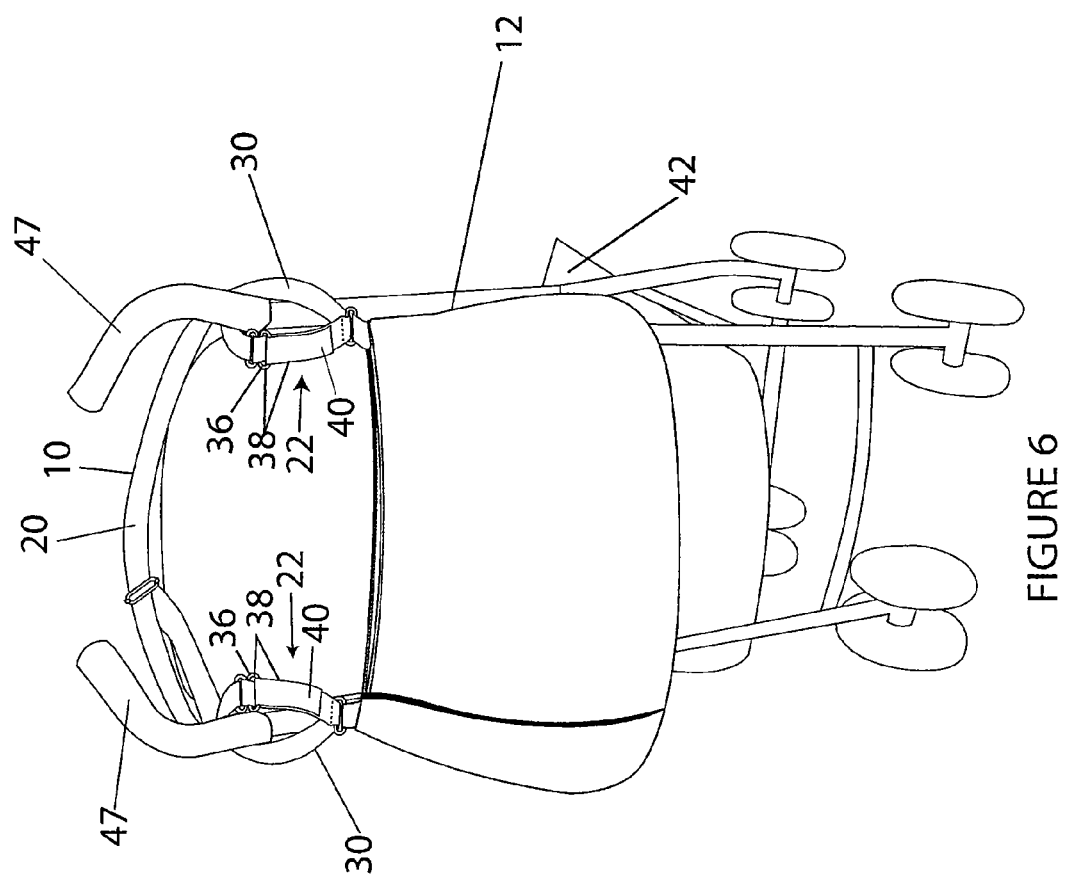
FIG. 6 shows schematically a pram with a bag attached thereto, the bag including an integrated attachment and holding means according to a further aspect of the present invention.

FIG. 5 shows schematically a pushchair 42 with a bag 12 attached thereto. The bag 12 includes an integrated attachment and holding means 10 according to one aspect of the present invention. It can be seen from FIG. 5, that the integrated attachment and holding means 10 may be placed over the handlebar/s 47 of the pushchair 42. The two parts 36 and 40 of the attacher 38 may be fastened around at least one suitable point of the baby transporting vehicle such that the bag 12 is connected about at least one suitable point of the baby transporting vehicle. The bag 12 may be connected to a plurality of connection points of the baby transporting vehicle. In FIG. 5 two attachment means 22 are each attached to two different connection points of the baby transporting vehicle 42. A non-limiting example of a suitable connection or attachment point of the baby transporting vehicle includes any part of the vehicles frame, handlebar 47, or a suitable supporting element. In some aspects the length of any part of the attachment means 22, may be adjustable, by a suitable adjustment means. In one aspect the length of the harness 30 may be adjustable. Non limiting examples of a suitable adjustment means include a slide buckle and a ring through which a Velcro® or press stud strip can be thread through. In such a way it may be possible to tighten the attachment means around the attachment point of the baby transporting vehicle. An adjustable means facilitates use of the attachment means 22 with different sizes of vehicle. In FIG. 5, the harness 30 is disposed about the vehicle attachment or connection point such that the attacher 38 is overtly visible to an onlooker. FIG. 6 shows schematically a pushchair 42 with a bag 12 attached thereto, including an attacher 38 as described in FIG. 4. FIG. 6 shows that after attachment of the integrated attachment and holding means 10 the attacher 38 is covertly disposed so that it is not so blatantly viewable to an onlooker.

It can be seen from FIG. 5 and FIG. 6 that the integrated attachment and holding means 10 of the present invention facilitate detachable attachment of the bag 12 to a baby transporting vehicle 42 and holding or raising the bag to a level which may be more conducive for easy access of the bag's contents. The bag may be secured such that it is at any suitable distance from the handles or handlebar 47 of the transporting vehicle to which it is attached. In one aspect, the integrated attachment and carrying means is configured for attachment to a baby transport vehicle and for holding the attached bag so that the bag opening is at about the same height as the handlebar 47. The bag opening may for example be up to about 50 cm below the handlebar 47. The integrated attachment and holding means may reduce the amount of bending down needed by a user to access the bag.

Figure 7:
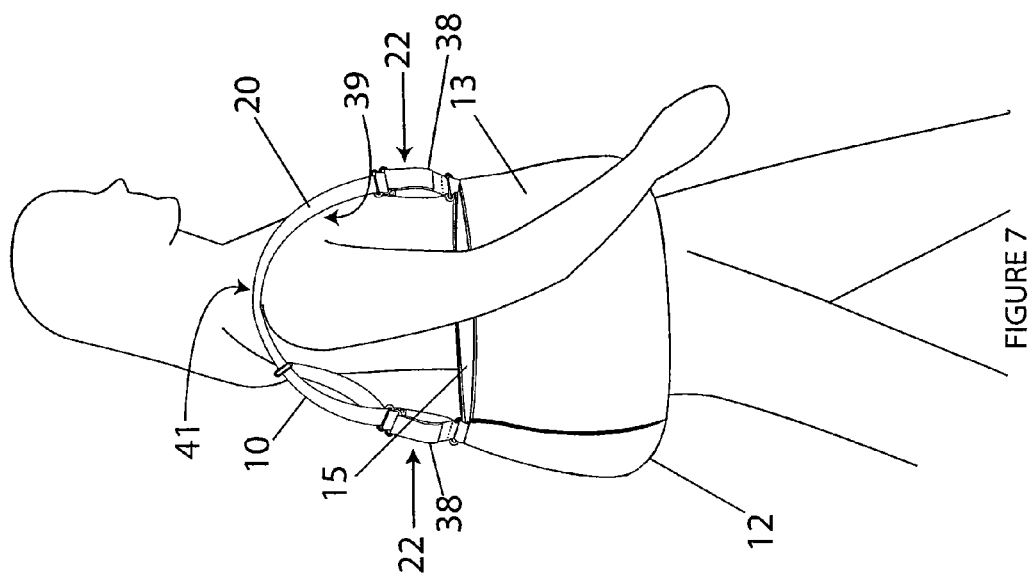
FIG. 7 shows schematically a bag being carried by a person according to an aspect of the present invention.

FIG. 7 shows schematically a bag comprising an integrated attachment and carrying means 10 being carried by a user according to an aspect of the present invention. In FIG. 7 it can be seen that the attachment means 22 may appear as an extension of the carrying means 20, when for example the bag is being carried via the integrated attachment and carrying means. In FIG. 7 the bag is carried on the shoulder of the person, such that the attacher 38 is disposed on the outer side 41 of the integrated attachment and carrying means 10. In an alternative aspect not shown in FIG. 7, the attacher 38 may be configured such that it is disposed on the inner side 39 of the integrated attachment and carrying means 10.

Figure 8:
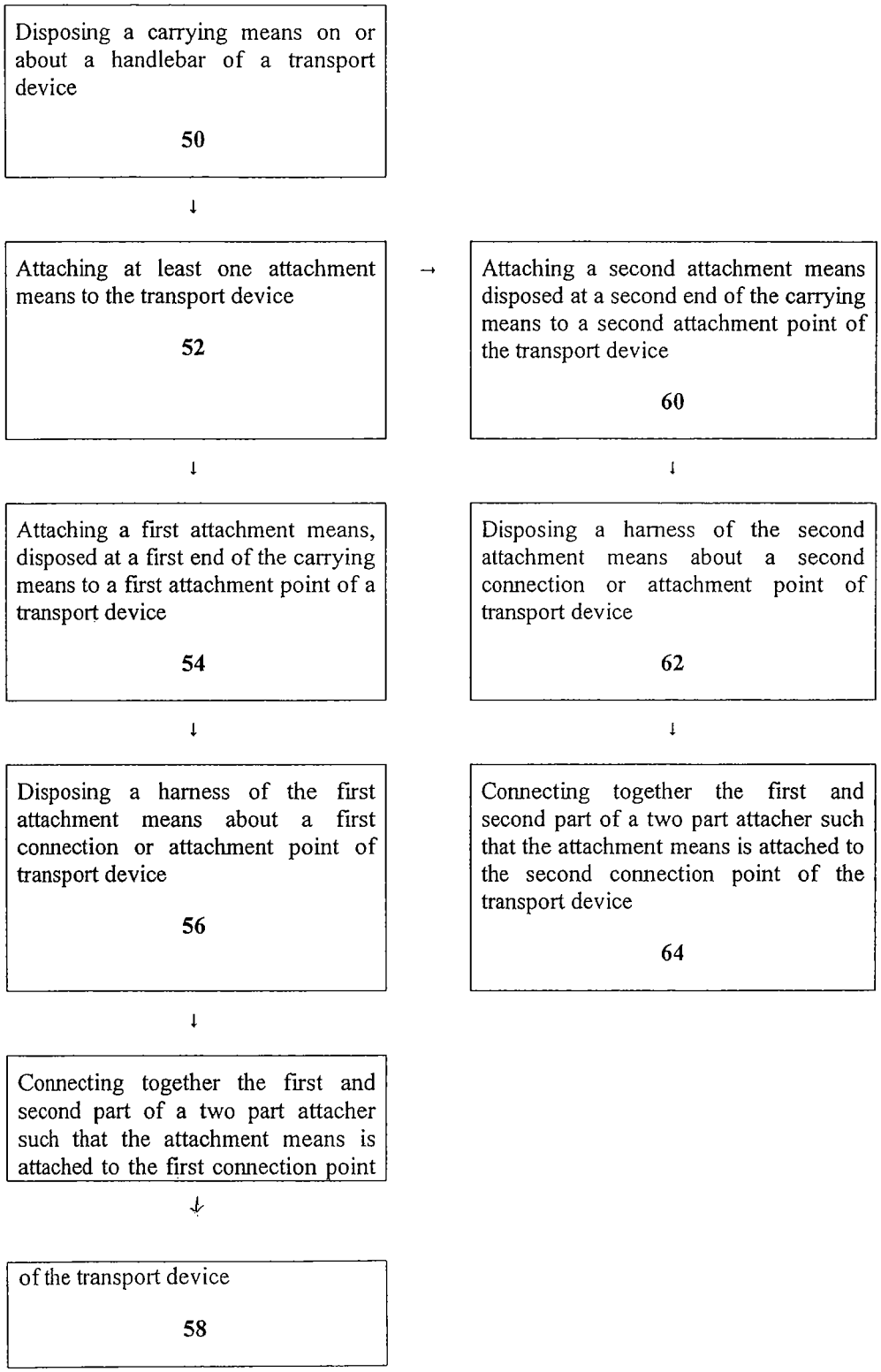
FIG. 8 shows schematically a method of use of a bag comprising the integrated attachment and carrying means according to one aspect of the present invention.

FIG. 8 shows schematically a method of use of a bag comprising the integrated attachment and carrying means according to one aspect of the present invention.

The method may comprise disposing a carrying means on or about one or a plurality of handlebar/s or other suitable part of a transport device 50. The at least one attachment means may then be attached to the transport device 52. A first attachment means disposed at a first end of the carrying means may then be attached to a first attachment point of a transport device 54. The method of attachment may include disposing the harness of the first attachment means about a connection or attachment point of transport device 56. The harness may include an attacher, such as a multi part attacher, for example a two part attacher comprising a first part and a second part. The first and second part of the two part attacher may be connected together in any suitable way such that the attachment means is attached to the first connection point of the transport device 58. In an aspect wherein the attacher comprises a Velcro® strip, the Velcro® strip may be inserted through a loop or link such that one part of the velcro® strip is contacted with the second part of the Velcro® strip for attachment of the hook part of the Velcro® to the loop part of the Velcro®. A second attachment means disposed at a second end of the carrying means may then be attached to a second attachment point of the transport device 60. The method of attachment of the second attachment means may include disposing the harness of the second attachment means about the second connection or attachment point of transport device 62. The harness may include a an attacher, such as a multi part attacher, for example a two part attacher comprising a first part and a second part. The first and second part of the two part attacher may be connected together such that the attachment means is attached to the second connection point of the transport device 64. The first and second parts of the two part attacher may be disconnected from each other prior to disposing the harness about a connection point of the transport device. The method is not limited to the order of steps as described herein, but may be done in any suitable order.

The present invention overcomes deficiencies of bags of the background art, wherein the strap of the bag of the present invention is configured for both attachment to a baby transport vehicle and for carrying of the bag.

It is envisioned that the integrated attachment and holding means may be used for attaching a bag which is not configured specifically for a baby related use to a baby transport vehicle. For example the integrated attachment and holding means may be used with a handbag, a shopping bag, a school bag or any other bag. In one aspect a plurality of bags may be attached to a baby transport vehicle using the same or a plurality of integrated attachment and holding means. Such an integrated attachment and holding means provides a way for a user to attach any suitable bag, which the user may be carrying.

In a further aspect, the integrated attachment and holding means may be used for attaching any suitable bag to a non-baby transport vehicle. Examples of suitable non-baby transport vehicles include a wheel chair, a scooter, a personal transporter, a motorbike, a bicycle, a walking frame and a zimmer frame. In one non-limiting example, a hand bag or shopping bag may include the integrated attachment and holding means of the present invention and may be attachable to a zimmer frame.

One skilled in the art can appreciate from the foregoing description that the broad structures and techniques of the aspects of the present invention can be implemented in a variety of forms. Therefore, while the aspects of this invention have been described in connection with particular examples thereof, the true scope of the aspects of the invention should not be so limited since other modifications will become apparent to the skilled practitioner upon a study of the specification, and following claims.

What is claimed is:

1. An integrated attachment and carrying device for detachable attachment to a transport device, comprising:
   a bag shaped and sized for receipt of articles;
   a strap configured for carrying by a user;
   at least one attachment component fixedly attached to or integrated between the strap and the bag, the attachment component, comprising;
   I) a harness comprising a first end attached to the strap and a second end attached to the strap; and
   II) an attacher comprising a first part and a second part, wherein the first part of the attacher is disposed at the first end of the harness, and wherein the second part of the attacher is disposed at the second end of the harness, and wherein the first part of the attacher detachably mates with the second part of the attacher for formation of the harness into a configuration shaped and sized to receive a connection point of the transport device while the attachment component remains fixedly attached between the bag and the strap.

2. The integrated attachment and carrying device of claim 1, wherein the length of the strap is adjustable.

3. The integrated attachment and carrying device of claim 1, wherein the harness is made from the same material as the strap.

4. The integrated attachment and carrying device of claim 1, wherein the length of the at least one attachment component is adjustable.

5. The integrated attachment and carrying device of claim 1, comprising an inner side and an outer side, wherein at least part of the inner side is for contacting the body of a user when carried or held and wherein the attacher is disposed on the inner side.

6. The integrated attachment and carrying device of claim 1, comprising an inner side and an outer side, wherein at least part of the inner side is for contacting the body of a user when carried or held and wherein the attacher is disposed on the outer side.

7. The integrated attachment and carrying device of claim 1, wherein the bag is configured for receipt of baby care items.

8. The integrated attachment and carrying device of claim 1, wherein the attacher comprises a hook and loop attachment.

9. The integrated attachment and carrying device of claim 8, wherein the first part of the hook and loop attachment comprises a piece of hook attachment and in spaced apart relation a piece of loop attachment and wherein the second part of the hook and loop attachment comprises a means through which at least a portion of the hook and loop attachment on the first part of the hook and loop attachment can be thread therethrough such that the hook portion of the hook and loop attachment and the loop portion of the hook and loop attachment are contacted one on top of the other.

10. A method of using the integrated attachment and carrying device of claim 1, comprising the steps of: disposing the strap about at least one handlebar of a transport device; disposing the harness about a connection point of the transport device; and connecting together the first and second parts of the attacher such that the harness is attached to the connection point of the transport device.

11. The method of claim 10, further comprising the step of disconnecting the first and second parts of the attacher from each other prior to disposing the harness about a connection point of the transport device.

12. A bag for removeable attachment to a transport device, comprising:
   a connector fixedly attached to the bag;
   a strap configured for carrying by a user; and
   an attachment assembly fixedly attached between the connector and the strap, the attachment assembly comprising: a harness, an attacher first part attached to a first end of the harness, an attacher second part attached to a second end of the harness, wherein the first end of the harness is attached to the strap and the second end of the harness is attached to the strap, wherein the attacher first part detachably mates with the attacher second part to form the harness into a loop adapted to receive a connection point of the transport device, while the attachment assembly remains fixedly attached between the connector and the strap.

13. The integrated attachment and carrying device of claim 12, wherein the length of the strap is adjustable.

14. The integrated attachment and carrying device of claim 12, wherein the harness is made from the same material as the bag carrying device.

15. The integrated attachment and carrying device of claim 12, wherein the length of the at least one attachment component is adjustable.

16. The integrated attachment and carrying device of claim 12, comprising an inner side and an outer side, wherein at least part of the inner side is for contacting the body of a user when carried or held and wherein the attacher is disposed on the inner side.

17. The integrated attachment and carrying device of claim 12, comprising an inner side and an outer side, wherein at least part of the inner side is for contacting the body of a user when carried or held and wherein the attacher is disposed on the outer side.

18. The integrated attachment and carrying device of claim 12, wherein the bag is configured for receipt of baby care items.

19. The integrated attachment and carrying device of claim 12, wherein the attacher comprises a hook and loop attachment.

20. The integrated attachment and carrying device of claim 19, wherein the first part of the hook and loop attachment comprises a piece of hook attachment and in spaced relation a piece and loop attachment and wherein the second part of the hook and loop attachment comprises a means through which at least a portion of the hook and loop attachment on the first part of the hook and loop attachment can be thread therethrough such that the hook portion of the hook and loop attachment and the loop portion of the hook and loop attachment are contacted one on top of the other.

* * * * *